3,084,041
PROCESS OF PRODUCING A NIOBIUM-TIN COMPOUND
Sylvester T. Zegler, Park Forest, and Joseph B. Darby, Jr., Wheaton, Ill., assignors to the United States of America as represented by the United States Atomic Energy Commission
Filed Feb. 9, 1962, Ser. No. 172,357
8 Claims. (Cl. 75—213)

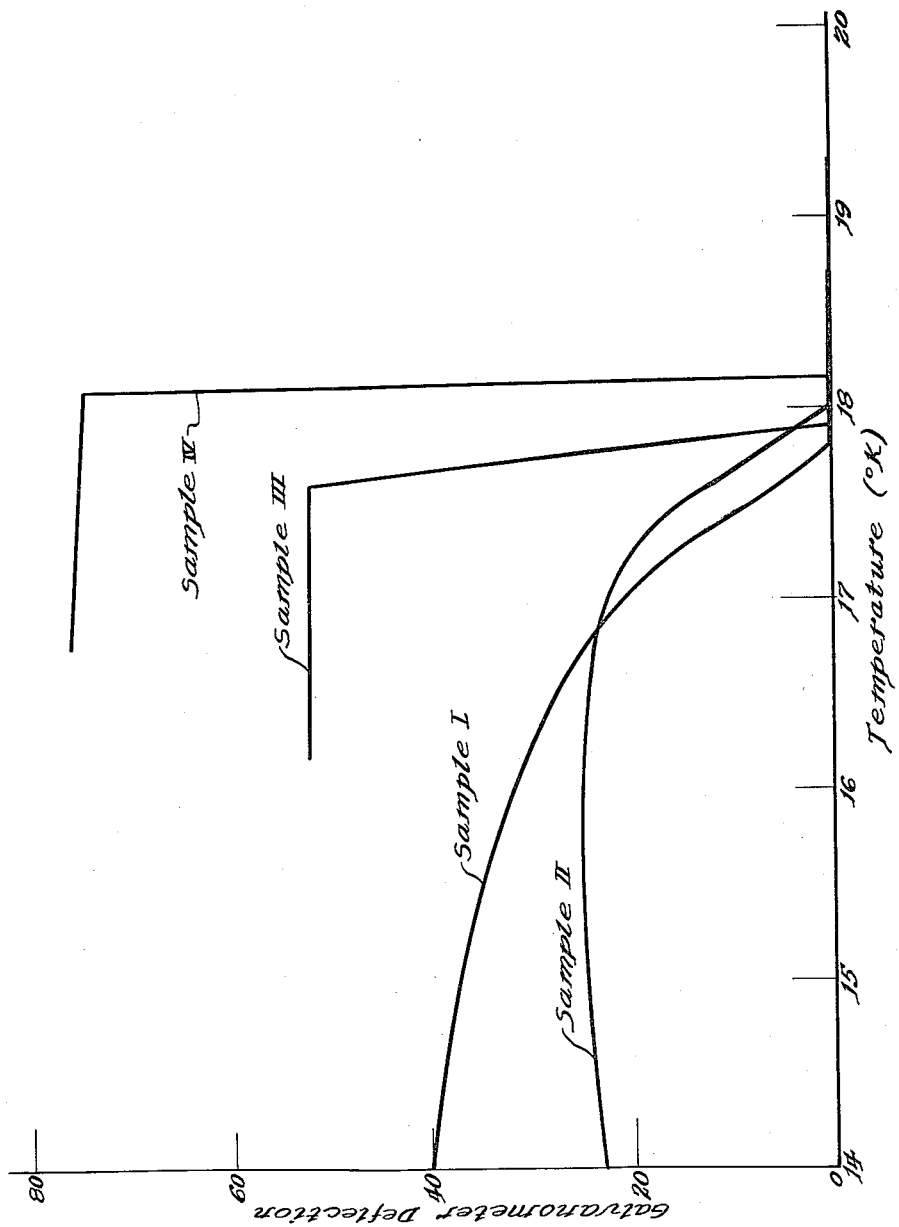

This invention deals with the production of a niobium-tin compound having the formula $Nb_3Sn$.

The compound $Nb_3Sn$ has been produced heretofore by mixing niobium and tin powders in stoichiometric amounts and sintering the mixture obtained. The $Nb_3Sn$ formed in that process, however, always contained unreacted niobium and/or tin; in other words, it was not a uniform homogeneous product. Niobium and tin powders mixed in stoichiometric amounts have also been enclosed in a niobium tube and heated therein at about 900° C.; but also there, a pure $Nb_3Sn$ was not obtained. It has furthermore been tried to melt a mixture of the elements in an arc furnace; in this process, too, difficulties were encountered and a uniform stoichiometric compound was not obtained mainly on account of volatilization of tin under the conditions used.

The compound $Nb_3Sn$ is used as a superconductor, and for this purpose it is most essential that the compound be free from excess niobium and excess tin, because the presence of these free metals can resistively heat up and increase the temperature above that critical for superconduction of $Nb_3Sn$. This critical temperature is 18.05° K. for $Nb_3Sn$.

It is an object of this invention to provide a process for the production of pure, uniform $Nb_3Sn$ that is entirely free from unreacted niobium and/or tin.

It is another object of this invention to provide a process for the production of pure, uniform $Nb_3Sn$ which does not require mixing of the components in stoichiometric amounts.

It is finally also an object of this invention to provide a niobium-tin product that becomes a superconductor at a temperature of 18.15° K.

These objects are accomplished by mixing niobium and tin powders, the latter being added in an amount in excess of that stoichiometrically required for forming $Nb_3Sn$; heating the mixture obtained to above 900° C. whereby the tin melts; maintaining said temperature of above 900° C. until all niobium has reacted with the molten tin under the formation of $Nb_3Sn$; cooling the reaction mass for solidification; mechanically disintegrating the mass to a powder; contacting the powder with concentrated hydrochloric acid whereby the unreacted excess tin is dissolved; decanting or otherwise separating the solid $Nb_3Sn$ from the tin chloride solution formed; rinsing the $Nb_3Sn$ first with water and then with alcohol; drying the $Nb_3Sn$; and sintering the $Nb_3Sn$ in an inert atmosphere at a temperature of between 900 and 1300° C.

While the quantity of tin used in the starting mixture has to be above 30% by weight, 30% being the stoichiometric amount, a quantity of between 35 and 60% is preferred. A mixture containing about 60% by weight of tin and about 40% by weight of niobium gave the very best results.

The temperature for the reaction of the niobium and tin preferably ranges between 900 and 1000° C. and is maintained for a period of from 7 to 12 hours; usually a reaction time of 9 hours was sufficient. The reaction is preferably carried out at a reduced pressure.

The reaction product, when viewed under the microscope, showed a matrix of tin in which $Nb_3Sn$ crystals were uniformly dispersed.

The mechanical disintegration can be carried out by any means known to those skilled in the art. In the experiments that led to this invention mortar and pestle were employed. Dissolution of the nonreacted tin with hydrochloric acid takes between 12 and 24 hours.

It was found advisable to repeat the process of mechanical disintegration, leaching with concentrated hydrochloric acid, rinsing with water and alcohol and drying in order to remove the last traces of excess tin and to assure a completely pure $Nb_3Sn$.

The $Nb_3Sn$ can then be sintered, preferably in an atmosphere of argon, helium or other inert gas, at a temperature between 900 and 1300° C.; this sintering step takes from 12 to 20 hours. Sintering at about 1100° C. for 16 hours was the preferred condition. Instead of sintering the powder per se, the $Nb_3Sn$ can also be inserted into a niobium tube and the powder be sintered therein; the tube, after sintering, can then be fabricated into a wire which, in turn, can be shaped into coils.

In the following an example is given to illustrate the process of this invention.

*Example*

Niobium powder, 105.36 grams, was mixed with 158.0 grams of tin powder. The mixture was introduced in an alumina crucible and heated thereto and held at about 900° C. for 8 hours, while a pressure of between $8 \times 10^{-7}$ and $2 \times 10^{-6}$ mm. of Hg was maintained. After these 8 hours the charge was completely melted; it was then allowed to cool to room temperature.

The excess tin was then removed by first melting the nonreacted tin and decanting the bulk of it from the solid $Nb_3Sn$ and then by dissolving the still remaining quantity in concentrated hydrochloric acid. For this purpose 4.86 grams of the solid compound were immersed in 500 ml. of concentrated hydrochloric acid for 65 hours at room temperature. The solid residue was then separated from the hydrochloric acid solution, washed successively with water and ethyl alcohol and dried; the product weighed 1.5 grams. X-ray diffraction yielded a pattern of practically pure $Nb_3Sn$.

Four samples were prepared by the process described above. Sample I, which weighed about 2 grams, was compacted at 188,000 p.s.i. into a pellet ¼" in diameter and 5⁄16" long. Sample II, weighing about 0.9 gram, was charged into a niobium tube of 0.005" thick walls and pressed at 56,000 p.s.i. into a pellet 0.2" in diameter and 0.4" length. Sample III weighed about 1.4 grams; it was compacted at 188,000 p.s.i. and sintered for 16 hours at 1100° C. The dimensions of the pellet were the same as those of the pellet of Sample II. The density of Sample II was determined and found to be 8.17 g./cc., which is 92% of the theoretical density. Sample IV was prepared from 0.9 gram of the powder confined by a niobium tube by sintering the assembly at 1100° C. for 16 hours; the pellet thus obtained too, was 0.4" long and had a diameter of 0.2".

The method used for determining the superconducting transition temperature was a magnetic method that utilizes Faraday's law of induction. The sample being tested is placed within and parallel to the field (in the order of 6 gauss) produced by a primary coil, and the influence of the specimen upon the inductance of a secondary coil is measured by means of a ballistic galvanometer. This secondary coil consisted of two sections wound in opposition and balanced by means of an external inductor. The sample was located within the core of the secondary coil opposite and parallel to only one of the opposing sections.

The measurements were carried out in a cryostat which consisted of three double-walled Pyrex glass Dewar vessels, namely an outer Dewar, which contained liquid nitrogen; a central Dewar, which contained liquid helium; and an inner Dewar into which the samples were placed in liquid hydrogen.

The samples were first cooled down to about 20° K. Then, for determining transition temperatures, the samples were further cooled stepwise down to about 14° K. Temperature control was obtained by adjusting the hydrogen vapor pressure with a low capacity vacuum pump.

The temperatures were measured by means of a small carbon resistor carrying microamperes of current. The resistor was connected in series with a resistance bridge of up to 4000 ohms. The resistor was calibrated at three known temperatures, the boiling point of helium, the triple point of hydrogen and the boiling point of nitrogen.

All temperature measurements were double-checked by vapor pressure measurements with a Wallace-Tiernan absolute pressure indicator.

In its normal state, the sample has no effect on the inductance of the secondary coil; hence no galvanometer deflection is produced. In its superconducting state, however, the expulsion of flux causes a field variation, which in turn affects the inductance of the secondary coil and results in a galvanometer deflection. The magnitude of the deflection is greater (1) the greater the primary field strength, (2) the greater the homogeneity, (3) the larger the mass of the specimen, and (4) the shorter the distance between the specimen and the secondary coil.

For a homogeneous superconducting material the transition from the normal to the superconducting state is discontinuous, i.e. abrupt, and the magnitude of the deflection is at a maximum and at a constant level for the superconducting state.

The results of the measurements for the four samples are compiled in the table below, and the functions between temperature and galvanometer deflection are shown in the diagrams on the attached drawing.

| Sample No. | Resistance (Ohms) | Pressure (mm. of Hg) | Temp. (° K.) | Galv. Defl. |
|---|---|---|---|---|
| I | 493 | 500 | 19.3 | 0 |
|  | 499 | 450 | -------- | 0 |
|  | 505 | 400 | 18.75 | 0 |
|  | 513 | 350 | 18.25 | 0 |
|  | 517 | 325 | 18.05 | 0 |
|  | 521 | 300 | 17.85 | 0 |
|  | 525 | 280 | 17.68 | 3 |
|  | 529 | 260 | 17.50 | 9 |
|  | 534 | 240 | 17.25 | 17 |
|  | 539 | 225 | 17.0 | 21 |
|  | 545 | 200 | 16.7 | 24 |
|  | 550 | 180 | 16.6 | 26 |
|  | 556 | 160 | 16.3 | 31 |
|  | 564 | 140 | 16.0 | 32 |
|  | 573 | 120 | 15.7 | 33 |
|  | 583 | 100 | 15.4 | 35 |
|  | 596 | 80 | 14.9 | 39 |
|  | 611 | 60 | 14.5 | 39 |
|  | 628 | 42 | 14.05 | 41 |
| II | 506 | 400 | 18.75 | 0 |
|  | 522 | 300 | 17.8 | 4 |
|  | 520 | 305 | 17.9 | 3 |
|  | 532 | 250 | 17.35 | 19 |
|  | 545 | 200 | 16.7 | 24 |
|  | 561 | 150 | 16.2 | 24 |
|  | 585 | 100 | 15.3 | 25 |
|  | 622 | 50 | 14.2 | 24 |
|  | 526 | 275 | 17.7 | 11 |
|  | 538 | 225 | 17.05 | 23 |
| III | 493 | 500 | 19.3 | 0 |
|  | 504 | 400 | 18.75 | 0 |
|  | 520 | 300 | 17.9 | 11 |
|  | 525 | 275 | 17.7 | 22 |
|  | 530 | 250 | 17.5 | 52 |
|  | 544 | 200 | 16.8 | 51 |
|  | 560 | 150 | 16.2 | 52 |
|  | 506 | 400 | 18.75 | 0 |
|  | 508 | 375 | -------- | 0 |
|  | 512 | 350 | 18.3 | 0 |
|  | 518 | 318 | 18.0 | 0 |
|  | 519 | 310 | 17.9 | ~1 |
|  | 529 | 265 | 17.5 | 51 |
|  | 524 | 280 | 17.7 | 18 |
|  | 527 | 270 | 17.6 | 52 |

| Sample No. | Resistance (Ohms) | Pressure (mm. of Hg) | Temp. (° K.) | Galv. Defl. |
|---|---|---|---|---|
| IV | 511 | 350 | 18.3 | 0 |
|  | 516 | 325 | 18.1 | 72 |
|  | 545 | 200 | 16.7 | 79 |
|  | 517 | 330 | 18.05 | 62 |
|  | 515.8 | 335 | 18.11 | 26 |
|  | 515.3 | 340 | 18.14 | 4 |
|  | 514.9 | 340 | 18.15 | 0 |

It will be seen from the results and perhaps more readily from the diagram that the sintered $Nb_3Sn$, whether it is contained in a niobium jacket or not, yields a very abrupt transition from the normal state to the state of superconduction. The transition for sample III occurred within 0.45° K. at 17.95° K. and that for sample IV within 0.05° K. at 18.15° K.

It will be understood that the invention is not to be limited to the details given herein but that it may be modified within the scope of the appended claims.

What is claimed is:

1. A process of preparing pure $Nb_3Sn$, comprising mixing tin and niobium powders, the quantity of tin powder being above 30% by weight of the mixture; heating the mixture to the reaction temperature of from 900 to 1000° C. whereby the tin melts; maintaining said reaction temperature until all niobium has reacted with the molten tin and been converted to $Nb_3Sn$; cooling the reaction mass for solidification; mechanically disintegrating the mass to powder; immersing the powder in concentrated hydrochloric acid whereby nonreacted tin is dissolved; separating the solid $Nb_3Sn$ from the tin chloride solution formed; rinsing the $Nb_3Sn$ with water and then with alcohol; drying the $Nb_3Sn$; and sintering the $Nb_3Sn$ in an inert atmosphere at a temperature of between 900 and 1300° C.

2. The process of claim 1 wherein tin is admixed in a quantity of from 35 to 60% by weight, the reaction temperature is approximately 900° C. and a reduced pressure is maintained during reaction.

3. The process of claim 2 wherein 60 parts by weight of tin are mixed with 40 parts by weight of niobium.

4. The process of claim 2 wherein the reaction temperature of about 900° C. is maintained for from 7 to 12 hours.

5. The process of claim 4 wherein the reaction temperature is maintained for about 9 hours.

6. The process of claim 1 wherein the $Nb_3Sn$ powder is immersed in the concentrated hydrochloric acid for from 12 to 24 hours.

7. The process of claim 1 wherein sintering is carried out in argon at about 1100° C. for about 16 hours.

8. A process of producing pure $Nb_3Sn$, comprising mixing about 60 parts by weight of tin powder with 40 parts by weight of niobium powder; heating the mixture to about 900° C. for about 9 hours under reduced pressure whereby the tin melts and reacts with the niobium under the formation of $Nb_3Sn$; cooling the reaction product for solidification; disintegrating the reaction product into a powdered material; immersing the powdered material in concentrated hydrochloric acid for from 12 to 24 hours whereby nonreacted tin is dissolved; decanting the tin chloride solution formed from the solid $Nb_3Sn$; rinsing the $Nb_3Sn$, first with water, then with ethyl alcohol; drying the $Nb_3Sn$; again powdering the $Nb_3Sn$; immersing the $Nb_3Sn$ in concentrated hydrochloric acid; separating the $Nb_3Sn$ from the hydrochloric acid solution; rinsing the $Nb_3Sn$ with water and then with alcohol; drying the $Nb_3Sn$; and sintering the $Nb_3Sn$ at a temperature of about 1100° C. for 16 hours in an argon atmosphere.

No references cited.